United States Patent [19]

Mizobuchi et al.

[11] Patent Number: 4,575,264
[45] Date of Patent: Mar. 11, 1986

[54] THRUST BEARING

[75] Inventors: Shotaro Mizobuchi, Kanagawa; Katsumi Sasaki, Tokyo; Yoshikazu Kimura; Kazuyuki Kasahara, both of Kanagawa, all of Japan

[73] Assignee: Ebara Corporation, Tokyo, Japan

[21] Appl. No.: 634,114

[22] Filed: Jul. 24, 1984

[30] Foreign Application Priority Data

Jul. 25, 1983 [JP] Japan ................. 58-134475

[51] Int. Cl.⁴ .................. F16C 17/06; F16C 17/16
[52] U.S. Cl. ..................... 384/369; 384/123
[58] Field of Search ............. 384/369, 368, 371, 305, 384/123, 112, 124

[56] References Cited

U.S. PATENT DOCUMENTS

| | | | |
|---|---|---|---|
| 1,496,809 | 6/1924 | Johnson | 384/368 |
| 3,439,962 | 7/1969 | Gothberg | 384/107 |
| 3,497,273 | 2/1970 | Muijderman et al. | 384/113 |
| 3,870,382 | 3/1975 | Reinhoudt | 384/123 |
| 3,883,314 | 5/1975 | Schnyder | 75/231 |
| 4,007,974 | 2/1977 | Huber | 384/123 |
| 4,213,659 | 7/1980 | Tielemans et al. | 384/398 |
| 4,315,359 | 2/1982 | Gray | 384/100 X |

FOREIGN PATENT DOCUMENTS

| | | |
|---|---|---|
| 2381199 | 9/1978 | France . |
| 16-12121 | 7/1941 | Japan . |

Primary Examiner—Stuart S. Levy
Assistant Examiner—Lynn M. Schacki
Attorney, Agent, or Firm—Wenderoth, Lind & Ponack

[57] ABSTRACT

A novel thrust bearing is provided in which a spiral element having a disc shape is loosely interposed between a pair of flat elements one of which is rotatable and the other of which is stationary, the spiral element having a spiral groove pattern on each of the opposite surfaces of the disc with the patterns on the respective surfaces reverse in relation to each other in their spiral direction.

2 Claims, 5 Drawing Figures

THRUST BEARING

FIELD OF THE INVENTION

The present invention relates to a thrust bearing, and more particularly to a thrust bearing used in a fluid wherein a fluid dynamic pressure is created between the elements of the bearing upon relative rotation thereof so that lubrication of the bearing is effected by the liquid under the dynamic pressure.

BACKGROUND OF THE INVENTION

A thrust bearing of a type noted above is usually employed in a submersible pump or a submersible motor, etc. One type of such thrust bearing utilizing dynamic pressure in liquid is known as a thrust bearing comprising a spiral element. For example, such spiral element is disclosed in Japanese Patent Publication No. 12121/66 and U.S. patent application Ser. No. 627,731 filed on July 3, 1984 assigned to the same assignee as this application. The thrust bearing having such a spiral element as described above is required to be rotated in one direction only to produce the dynamic pressure between the spiral element and an opposing element which are caused to move in relative rotation. This type of bearing has been satisfactory for its intended use; however, should there be any mistake such as erroneous connection of wires leading to the power source, the bearing would be subjected to rotation in the wrong direction so that no dynamic pressure is produced between the elements. Therefore, under such situation, if the shaft already has a thrust load imposed on it, seizure may be caused in the bearing.

If it is intended to allow the rotation of the shaft in both the normal and opposite directions, another type of thrust bearing, e.g. a tilting pad type metal bearing, must be used. However, such metal bearing is rather easily abraded compared to the thrust bearing using a spiral element or is subject to troubles caused by foreign materials entrained on the bearing surfaces, is associated with a relatively large mechanical loss consuming a large amount of power and needs a lubricating medium of relatively high viscosity. Also, such conventional metal bearing is not suitable for equipment adapted to handle liquid of high temperature. Therefore, it has been desired to have a thrust bearing which can overcome the drawbacks noted above.

SUMMARY OF THE INVENTION

Accordingly, it is an object of the present invention to provide a thrust bearing which is capable of being rotated in both a normal direction and an opposite (reverse) direction yet always withstand a thrust imposed thereon.

It is a further object of the present invention to provide a thrust bearing of the type which may incorporate the advantages of the thrust bearing disclosed in the above-mentioned U.S. patent application Ser. No. 627,731 and still provide the capability of withstanding a thrust load while being rotated in the normal and opposite directions.

The objects above are accomplished according to the present invention. In the present invention, a disc element having a spiral groove pattern on each of its respective opposite surfaces is employed between flat elements opposing each other and is adapted to move in relative rotation therebetween, one of the flat elements being coupled to a shaft for rotation with a thurst force.

The spiral groove pattern on each of the opposite surfaces is formed such that the pattern generates a fluid dynamic pressure on the surface thereof when the flat elements are caused to move in relative rotation within liquid with the disc element interposed therebetween. (Hereinafter, for the sake of convenience, the disc element having spiral groove patterns on both surfaces is referred to as a spiral element.)

The spiral groove pattern is arranged to direct liquid from the peripheral portion to the central portion of the spiral element upon relative rotation between the spiral element and the opposing flat surface of the flat element.

Since the spiral element according to the present invention is provided with the spiral groove pattern on opposite surfaces thereof, it is able to generate fluid pressure whenever the shaft is rotated in either the normal or the opposite direction.

The spiral element is made of hard material and preferably sintered ceramics.

The further objects and advantages of the present invention will become more clear when the detailed description of the preferred embodiment is reviewed referring to the accompanying drawings, a brief description of which is summarized below.

DETAILED DESCRIPTION OF THE PREFERRED EMBODIMENT

Before explaining the present invention, an explanation of the prior art bearing will be given for better understanding of the present invention.

Figure 1:
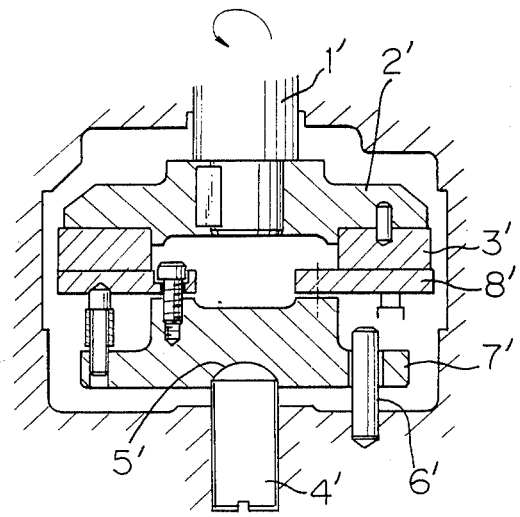
FIG. 1 shows a conventional tilting pad type thrust bearing in cross section.

In FIG. 1, a conventional tilting-pad type bearing is illustrated in cross section. An upper bearing support 2' is firmly secured to the bottom end of a rotatable shaft 1' and a disc 3' is secured to the support 2'. A pad 8' opposing the disc 3' is disposed on a lower support 7' so as not to be rotatable relative to the support 7'. The lower support 7' is supported on a spherical surface 5' of a stationary shaft 4' so as to be prevented by a pin 6' from being rotated. In this construction, if any unevenness should be produced on the sliding surface of the disc 3' and/or the pad 8' by abrasion or foreign materials entrained therebetween, heat will be generated in such uneven portion and therefore, setting of the condensed material due to this heat may occur on the surfaces which may promote further abrasion. Also, in this type of bearing, lubrication with a highly viscous medium is required which may lead to problems of sealing, cooling and deterioration of the medium. Additionally, this type bearing can not be used for equipment handling a high temperature liquid such as hot springs or subterranean hot water.

Figure 2:
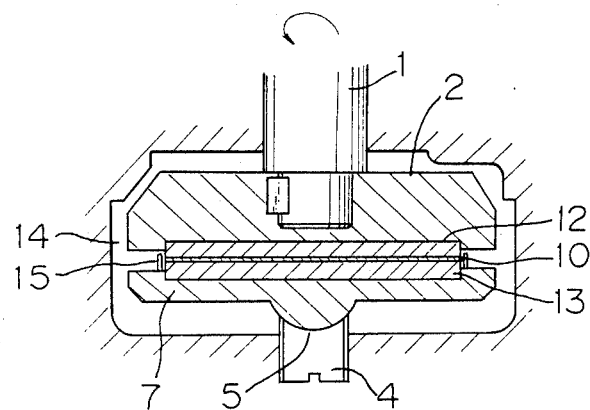
FIG. 2 shows an embodiment of the thrust bearing of the present invention in cross section.

Referring now to FIG. 2, there is schematically shown in cross section a thrust bearing according to one embodiment of the present invention. An upper support 2 is secured to a rotatable shaft 1 so as to be rotated therewith. An upper flat element 12 of the thrust bearing is secured to the upper support 2. A lower support 7 is supported on a stationary shaft 4 through a spherical surface 5 and a lower flat element 13 is firmly received on the support 7. The flat surfaces of the flat elements 12 and 13 are arranged to be opposed to each other with a predetermined gap therebetween. In this gap, a spiral element 10 is disposed, and the bearing elements 10, 12 and 13 are disposed within a bearing chamber 14 filled with a lubricating medium or liquid. The spiral element 10 is provided with a spiral groove pattern on each of the opposite surfaces thereof, the patterns on the opposite surfaces being formed so as to be opposite to each other with respect to the spiral direction. The spiral pattern will be explained referring to FIG. 3. A plurality of pins 15 are arranged around the spiral element 10 so as to prevent the spiral element from being radially displaced.

Figure 3:
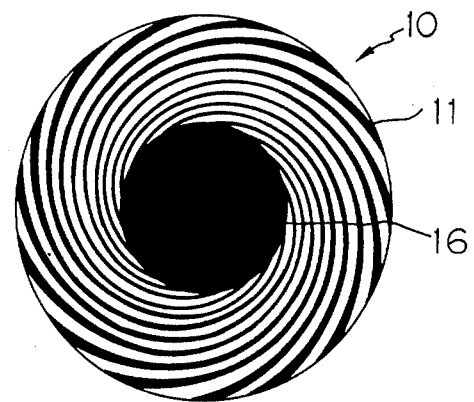
FIG. 3 is a plan view of the spiral element shown in FIG. 2.

A plan view of the spiral element 10 is illustrated in FIG. 3. The black portions in this drawing correspond to the recessed portions forming the grooves 11 and the central recessed area 16. The pattern on the opposite surface is formed in a reverse fashion to that shown in FIG. 3. The direction of the spiral grooves 11 is arranged to direct liquid from the peripheral portion toward the central portion 16, when the shaft 1 is driven in the normal direction with the bearing disposed in the liquid, to produce a dynamic fluid pressure between the opposing surfaces of the flat element 12 and the spiral element 10. The pattern on the opposite surface of the element 10 shown in FIG. 3 is formed in the reverse direction to that shown so that, when the shaft 1 is driven in the opposite direction, the fluid dynamic pressure is produced between the opposing surfaces of the spiral element 10 and the flat element 13. Thus, if the spiral element 10 is transparent, the spiral groove patterns on the opposite surfaces will be seen as similarly directed spiral patterns when viewed from one side.

In order to make the bearing life longer, the elements 10, 12 and 13 are made of hard materials. It is particularly preferable to make the spiral element 10 from sintered ceramics such as silicon carbide (SiC), silicon nitride ($Si_3N_4$) etc. The flat elements 12 and 13 are preferably made of alumina ceramics ($Al_2O_3$), sintered hard metal, bronze containing lead and cast iron, etc.

While the ceramics are superior in anti-corrosion properties, they are difficult to be worked, particularly to having grooves formed thereon. The depth of the grooves on the spiral element is preferably within the range between 3 $\mu$m and 50 $\mu$m. Formation of such grooves on the surface of ceramics has been difficult. However, the process for such formation using shot-blasting has been made available by the method as is disclosed in U.S. patent application Ser. No. 627,731 and description thereof is incorporated herein.

In the case where the flat elements 12 and 13 are made from cast iron, the upper and lower supports 2 and 7 may be made unitarily with the upper and lower elements 12 and 13, respectively.

In operation of the thrust bearing shown in FIG. 2, if the shaft 1 is driven in the normal direction with a thrust load imposed thereon, the lubrication medium is forcibly directed from the peripheral portion to the central portion of the spiral element 10 through grooves 11 and produces a dynamic fluid pressure between the elements 10 and 12 for forming a liquid film of such thickness as is necessary to support the thrust load. On the other hand, on the opposite surface area of the spiral element, no dynamic pressure is produced due to the backward direction of the spiral grooves formed thereon and there is a tendency to discharge liquid outwardly through the grooves which causes a suctioning effect between the elements 10 and 13 whereby the spiral element 10 becomes adhered to the flat element 13. Therefore, it is unnecessary to fix the spiral element 10 to the flat element 13 whereby there will be no drawback such as thermal cracking due to the difference in thermal expansion coefficient between the firmly connected elements and, thus, the bearing is suitable for use under high temperature. If the shaft 1 is driven in the reverse or opposite direction for some reason such as erroneous connection to the power source, the spiral element 10 is caused to adhere to the upper flat element 12 because of the suctioning effect produced between the elements 10 and 12 and, on the opposite surface of the element 10, a dynamic pressure is produced to support the thrust load.

In order to demonstrate and confirm the characteristic features of the thrust bearing according to the present invention, a test was conducted to compare the thrust bearing according to the present invention and the conventional tilting pad type thrust bearing.

Figure 4:
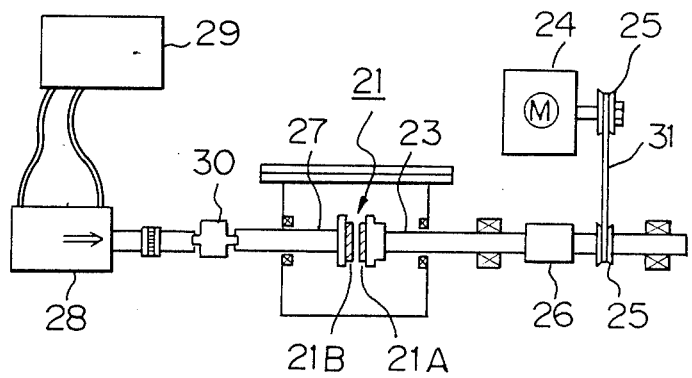
FIG. 4 schematically illustrates testing equipment for evaluating the features of the trust bearings.

FIG. 4 schematically illustrates the testing equipment. The thrust bearing under test is represented by the reference 21 comprising elements 21A and 21B. In the case where the bearing under test is the conventional tilting pad type, 21A corresponds to the element 3' and 21B corresponds to the pad element 8' in FIG. 1, respectively. However, in the case where the test bearing is of the type according to the present invention, 21A corresponds to the flat element 12 and 21B corresponds to the flat element 13 in FIG. 2, respectively and the spiral element is interposed between 21A and 21B. A rotary shaft 23 supports the rotary element 21A and is driven by a variable speed motor 24 through a belt 31 trained around pulleys 25. The motor 24 may rotate at a speed of between 10 r.p.m and 5000 r.p.m. On the shaft 23, a torque meter 26 is mounted. In opposing relation to the element 21A, the element 21B is disposed on a non-rotatable shaft 27. A hydraulic cylinder 28 (capable of applying maximum thrust of 10,000 kg.f) is coupled to the shaft 27 so as to impose a test load on the bearing to be tested. The hydraulic cylinder 28 is operated by a hydraulic pump 29. A load cell 30 is disposed between the cylinder 28 and the shaft 27 to measure the thrust load.

The sample bearings tested were as follows:

TEST I (ONLY PRESENT INVENTION)

Present Invention Bearing

| Spiral element: | |
| --- | --- |
| Material: | Sintered SiC |
| Outer Diameter: | 86 m/m |
| Diameter of Central Recessed Area (16 in FIG. 3): | 40 m/m |
| Thickness: | 2 m/m |
| Groove Depth: | 10 $\mu$m |
| No. of Spirals (one surface): | 15 |
| $\dfrac{\text{Total groove area}}{\text{Total land area}}$ : | 1 |
| Flat Elements: | |
| Material: | Sintered Alumina Ceramics |
| Lubricating Medium: | Water (room temperature) |
| Revolutions: | 3000 r.p.m. |

It was observed that the power loss was only 350 watt under a thrust load of 3500 kg.f.

TEST II (COMPARISON BETWEEN THE PRESENT INVENTION AND THE CONVENTIONAL TILTING PAD TYPE)

Present Invention Bearing

Spiral element was the same as that in Test 1 except for the flat elements which were made of cast iron and lubrication medium which was 75% propylene glycol.

Prior Art Bearing (conventional tilting pad type)

Rotary element: Carbon

Stationary element: 13% Cr Stainless Steel

The total area of sliding surfaces of this bearing was arranged to be equal to the area of the spiral pattern area on one side surface of the spiral element employed in the bearing of the present invention.

Lubrication medium was 75% propylene glycol.

Figure 5:
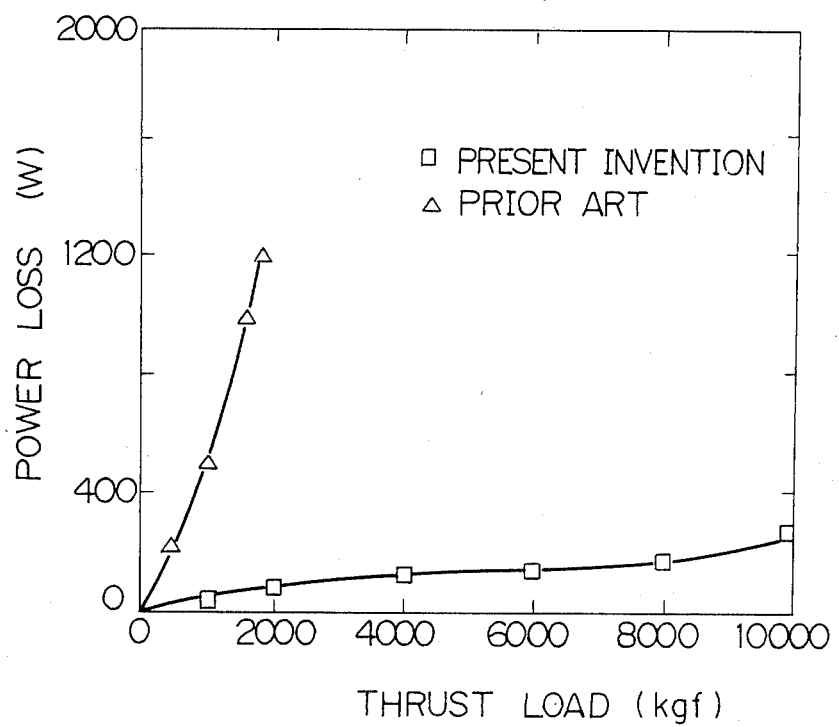
FIG. 5 illustrates the result of a test conducted by the equipment shown in FIG. 4.

The result of Test II is graphically shown in FIG. 5 wherein the relationship between the power loss v.s. thrust load is plotted. The conventional thrust bearing seized at a thrust of 1800 kg.f and the power loss was as large as 1200 W at this point. However, with the thrust bearing according to the present invention, there was no seizure at the high load of 10,000 kg.f and the power loss was measured as being as small as 280 W at this point. In both Test I and Test II above, it was observed that the intermediate spiral element was kept stationary relative to the first element where the fluid dynamic pressure is not produced. This is because the friction coefficient is 0.003 between the spiral element and the flat element in the case where there is a dynamic fluid pressure produced between the elements, whereas it reaches approximately 0.3 where the dynamic pressure is not produced. Therefore, there is a difference of over 100 times in the required torque in terms of the ratio between the opposite surfaces of the spiral element and this large difference substantially keeps the spiral element stationary relative to the flat element at one side of the spiral element.

Now, it will be clear from the foregoing that the present invention provides many advantages over the prior art as summarized below.

a. The intermediate spiral element is not fixed to either of the rotating shaft side or the stationary side and, thus, there is no problem derived from the difference in thermal expansion coefficient such as occurs in the case where the element is firmly secured to the other element.

b. The feature "a" above enables the construction of the bearing to be simple.

c. The feature "a" above also enables a brittle element such as sintered Silicon Carbide to be easily employed as a spiral element. The employment of such sintered ceramics remarkably improves the capacity of the bearing as disclosed in the U.S. patent application Ser. No. 627,731.

d. A thin disc with a thickness of, for example, 1 mm to 2 mm may be used as a spiral element and, not being fixed to the other element, the manufacturing cost of the bearing is greatly reduced.

e. A lubrication medium of high viscosity is not required and, thus, liquid such as water to be handled by submersible equipment may be used for lubrication.

This also reduces the problems regarding sealing, cooling and deterioration of the medium.

f. Because sintered ceramics may be used, handling of high temperature liquid is made possible without trouble.

g. Power loss is as small as, say, under 1/5 of that required in the conventional tilting pad type bearing whereby the shaft is able to be made small, the capacity of the motor can be reduced and the total dimension of the apparatus using the bearing of the present invention may be kept small.

While the present invention has been explained in detail, the present invention is not limited to what is explained above but it can be used in any place where a thrust bearing is used and it may be modified by those skilled in the art within the sprit and scope of the present invention defined by the appended claims.

What is claimed is:

1. A thrust bearing comprising:

a pair of opposing flat elements, one of which is secured to a rotatable shaft and the other one of which is held stationary; and a spiral element made of hard material in a disc form and interposed between said pair of flat elements and freely relatively rotatable with respect to said flat elements, said spiral element having a spiral groove pattern on each of the opposite surfaces thereof with the spiral direction of the pattern on the surface on one side being reverse to that on the surface on the other side, and a liquid lubricating medium between the flat elements and the spiral element, wherein when the shaft is driven in one direction the lubricating medium on one side of said spiral element is directed from a peripheral portion of said spiral element to the central portion thereof creating thrust between the spiral element and the rotatable flat element, and on the opposite side of the spiral element the lubricating medium is discharged outwardly causing a suction between the spiral element and the stationary flat element, and when the shaft is driven in the other direction, the lubricating medium on said one side of said spiral element is directed from a central portion of the spiral element to the peripheral portion thereof creating a suction between the spiral element and the rotatable flat element, and on the opposite side of the spiral element the lubricating medium is directed from the peripheral portion of the spiral element to the central portion thereof creating thrust between the spiral element and the stationary flat element.

2. A thrust bearing according to claim 1 wherein said spiral element is made of sintered ceramic.

* * * * *